April 17, 1951 J. A. VOLK 2,549,752
RECORDING WEIGHT AND PRICE SCALE
Filed Feb. 20, 1948 3 Sheets-Sheet 1
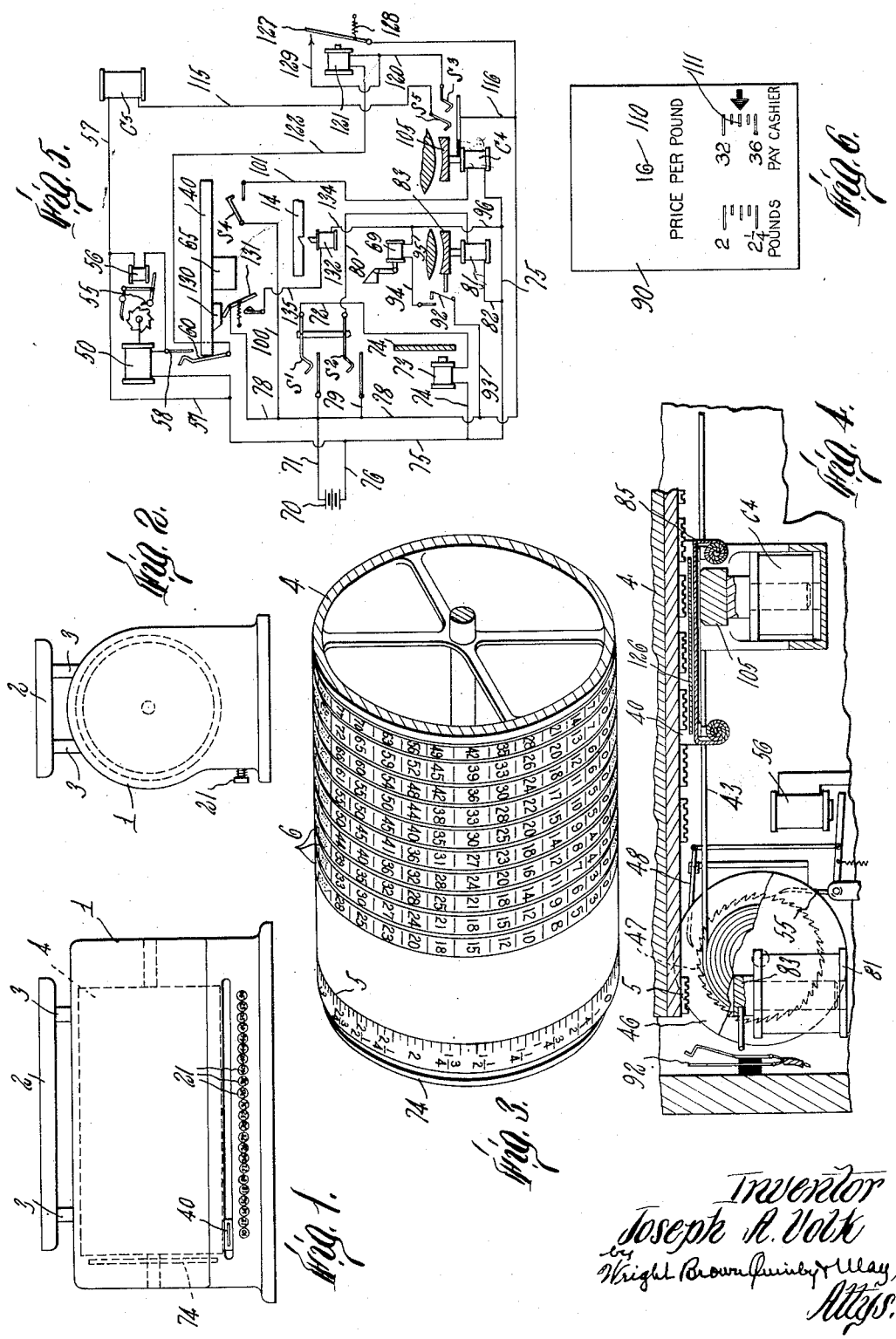

April 17, 1951 J. A. VOLK 2,549,752
RECORDING WEIGHT AND PRICE SCALE
Filed Feb. 20, 1948 3 Sheets-Sheet 2

Inventor
Joseph A. Volk
by
Wright, Brown, Quinby & May
Attys.

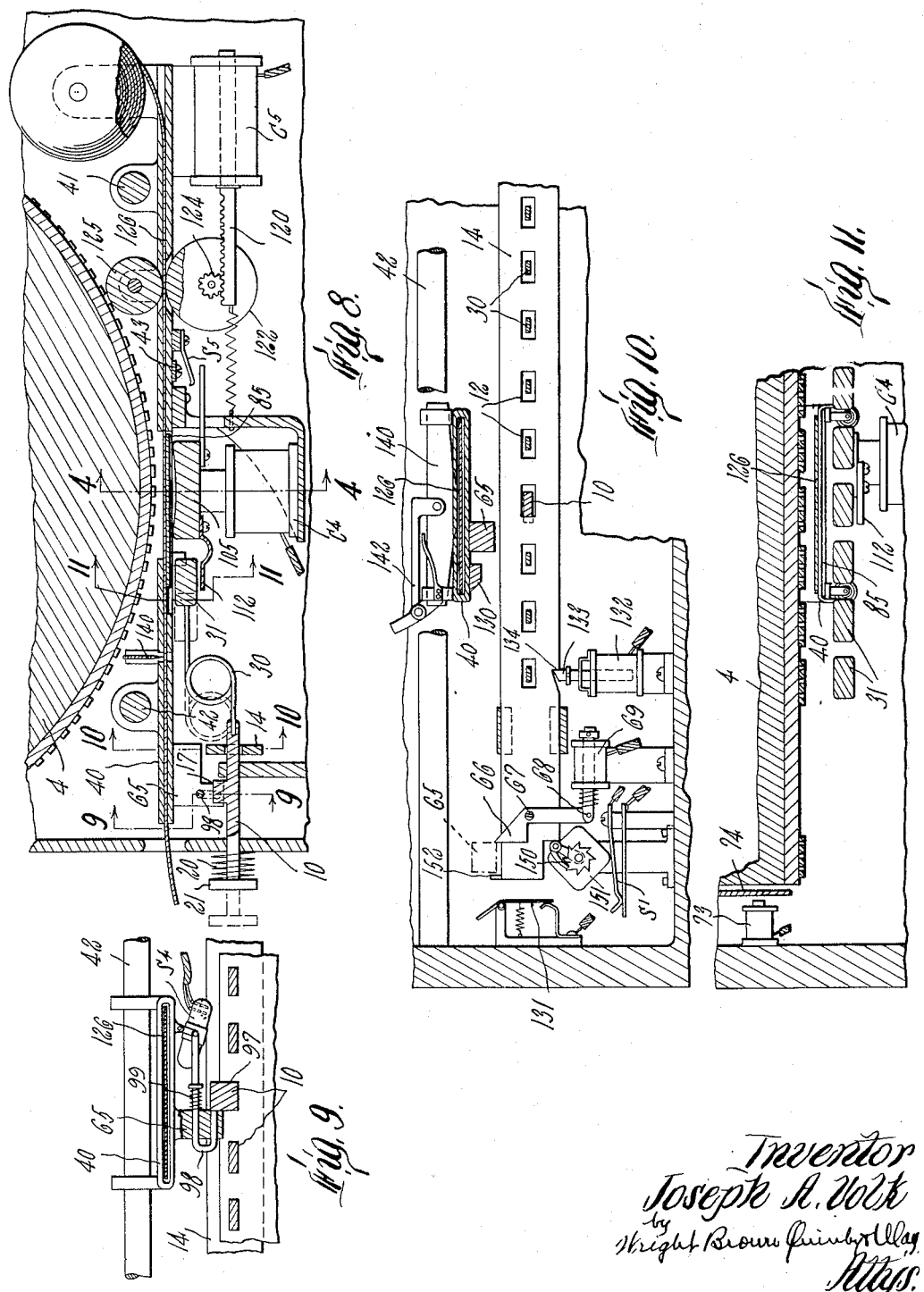

Patented Apr. 17, 1951

2,549,752

UNITED STATES PATENT OFFICE 2,549,752

RECORDING WEIGHT AND PRICE SCALE

Joseph A. Volk, Wilton, Conn.

Application February 20, 1948, Serial No. 9,670

12 Claims. (Cl. 346—10)

This invention relates to computing scales, and has for an object to provide mechanism by which a printed record showing the weight, the price per unit weight, and the total price as shown by the computing mechanism may be made, thereby minimizing chances of error and dispute.

A further object is to provide such a mechanism which will not interfere with the free response of the weighing mechanism to load placed thereon.

Still another object is to provide such a mechanism having a plurality of actuators each corresponding to a unit price, and by the actuation of any selected one of which while the scale is loaded, the actuating mechanism is caused to print and deliver a ticket having indicated desired price and weight information thereon and showing the unit price corresponding to the actuator employed.

For a complete understanding of this invention, reference may be had to the accompanying drawings in which Figures 1 and 2 are somewhat diagrammatic front and side elevations, respectively, of a scale embodying the invention.

Figure 3 is a perspective view to a larger scale of the type-carrying drum.

Figure 4 is a fragmentary vertical sectional view on line 4—4 of Figure 8 showing the printing mechanism.

Figure 5 is an electrical diagram of the mechanism.

Figure 6 is a plan view of a ticket as printed where the weight of the goods on the scale is 2⅛ pounds, the price per pound 16¢, the total price being shown as 34¢.

Figure 8 is a detail sectional view on line 8—8 of Figure 4.

Figure 7:
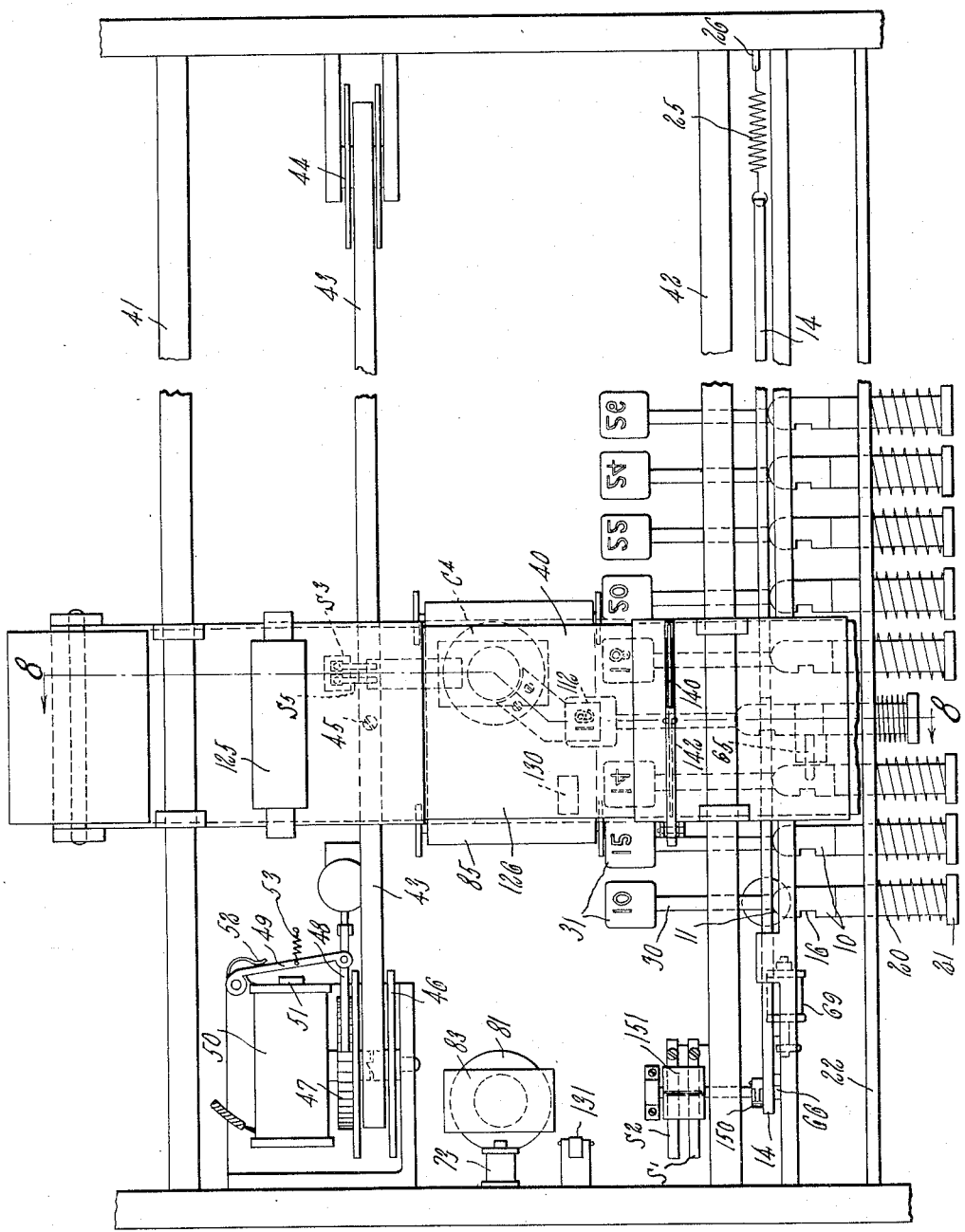
Figure 7 is a fragmentary top plan view of the lower portion of the machine, the upper part having been removed.

Figures 9, 10, and 11 are detail sectional views on the correspondingly numbered section lines of Figure 8.

Referring first to Figures 1 and 2, there is shown somewhat diagrammatically a computing scale having a casing 1 surmounted by a platform 2 on which the articles or material to be weighed may be placed. This platform 2 is supported on posts 3 which descend proportional to the weight placed on the platform 2 and turn a drum 4 positioned within the casing to an angular extent from a position of rest depending upon the weight on the platform 2.

The drum 4 is similar to the drums commonly found in computing scales, except that in place of the weight indications and computed prices for various unit costs, the drum 4 is provided on its periphery with type. This type is arranged in a plurality of peripheral series spaced along the length of the drum, as shown in Figure 3. At the left hand end, the first type zone 5 indicates weight and is suitably graduated to this end, the type indication corresponding to any particular weight placed on the platform 2 being positioned at the lowermost angular position.

Also carried by the drum 4 are peripheral series of type at the zones 6 indicating corresponding total prices for the weight indications in zone 5 arranged in transverse alinement therewith, for various prices per unit weight. For example, as shown in Figure 3, the left hand zone 6 carries type indicating the total cost for corresponding weights in the zone 5 at the rate of 10¢ per unit weight, the succeeding zones 6 to the right of the first zone carrying type indications corresponding to the total cost for the weight in axial alinement therewith and for increasing costs per unit weight such as 12¢, 14¢, 16¢, etc.

Also arranged along the length of the drum 4 and beneath it are a series of movable actuators 10 which may be pressed inwardly from the full line position shown in Figure 7 to the rear position shown in dotted lines for the indication 16. Each of these actuators 10 is provided with an inner rounded end 11 which is normally positioned just forwardly of a slot 12 through a bar 14 movable lengthwise and lengthwise of the axis of the drum 4. Back of the forward end 11 of each of these actuators it has on one edge a notch 16. When any of these actuators is moved rearwardly against the pressure of a coil spring 20, reacting between its head 21 and a fixed frame element 22, the bar 14 is moved lengthwise to the left against the action of a spring 25 (see Figure 7) which engages its right hand end and is hooked at its other end in a fixed eye 26. As soon as the actuator is pressed rearwardly sufficiently, the bar 14 snaps into the actuator notch 16 which holds the actuator in its inwardly pressed position and allows the bar 14 to snap back slightly from its extreme left hand position. In assuming its extreme left hand position, its left end closes two switches S1 and S2, which start the cycle of operations of the machine as will later more fully appear.

Each of the actuators 10 has attached to its inner end a spring element 30 to the rear end of which is secured a type-carrying element 31, this element conforming in type indication magnitude to the price per unit weight represented by the particular actuator carrying it. For example, as shown in Figure 7, the three left hand actuators have type indications "10," "12" and "14," respectively.

Cooperating with the type on the drum 4 and on the particular actuator which happens to be pushed in at any one time is mechanism carried by a carriage 40. This carriage is mounted on longitudinal rails 41 and 42 (Figure 7) for motion lengthwise of the axis of the drum 4 and beneath it. This carriage is normally urged toward the right hand end of the machine, and for this purpose it has attached thereto a flexible ribbon 43 which passes at the right hand end of the scale about a spring drum 44. This ribbon 43 may be secured to the carriage 40 as at the screw 45.

At its opposite end the ribbon 43 passes about a reel 46 which may be provided with electrical means for turning it in a direction to wind up the ribbon 43 thereon in opposition to the pull of the reel 44. As shown this means comprises a ratchet wheel 47 fixed to the reel 46 with which cooperates a spring dog 48 carried at the end of an armature 49 of a solenoid motor 50, the parts being so arranged that when the solenoid 50 is energized, the arm 49 is pulled over toward its armature 51, pulling the dog 48 against the teeth of the ratchet wheel 47 in a direction to wind up the ribbon 43, but as soon as the stroke of the ratchet wheel is about completed, the current is interrupted to the solenoid 50 at the contact 52 (Figure 7). This allows the arm 49 to be pulled away from the armature 51 as by the action of a spring 53, retracting the dog 45, until contact is again made at the contact 52, reenergizing the solenoid motor 50 and causing the dog 48 to make a second inward stroke. During the time that the solenoid motor 50 is energized retrograde motion of the ribbon 43 under the action of the spring drum 44 is prevented by the action of a holding dog 55 which is held in position to engage the ratchet wheel by the energization of a solenoid 56 which is arranged in parallel across the leads 57 and 58 through which energy is fed to the motor 50.

When the motor 50 has operated thus intermittently for a sufficient time to bring the carriage 40 to its left hand limit, a portion of this carriage strikes a switch arm 60 in series with the motor 50 and the solenoid 56, opening this switch 60, thus terminating the operation of this motor and freeing the holding dog 55 so that the spring reel 44 is in condition to move the carriage 40 to the right whenever this is permitted by other mechanism. In this left hand position of the carriage a stop member 65 on the carriage (see Figures 5, 8 and 10) engages back of a latch finger 66 fulcrumed at 67 on the bar 14, the stop member 65 being shown in dotted lines in this position in Figure 10. The latch member 66 is connected at its lower end to an armature 68 of a solenoid 69 by the energization of which the latch 66 may be swung in position to withdraw its upper end from the upper edge of the bar 14 to thus release the latch bar 65.

When the switch S' is closed by pressing inwardly on any one of the actuators 10, a circuit is closed from a source of supply 70 through the lead 71, switch S', lead 72, braking solenoid 73, and leads 74 and 75 and lead 76 back to the source of supply. Energization of the solenoid 73 acts upon a ring segment 74 carried by the drum 4 as a brake to prevent the oscillation or rotation of the drum 4 after initiation of the cycle of operations has been started by pressing inwardly any of the selectors 10.

Closing of the switch S2 completes a circuit from the source of supply through leads 71, 78 and 79, switch S2, leads 80 to the printing solenoid 81, lead 82 and lead 75 back to the power source. Energization of the solenoid 81 causes the hammer 83 of one of the printing devices to strike the typewriter ribbon 85 on the carriage 40 beneath the type in the zone 5 which is downwardly presented and which shows the weight which has been applied to the scale, this determining the angular position of the drum. A weight indication is thus printed upon a ticket 90 along the left hand margin as shown in Figure 6.

As the hammer 83 approaches the printing position, it closes a switch at 92 (see Figure 5) establishing a circuit from the lead 78 through the lead 93, switch 92, lead 94, to the releasing solenoid 69, leads 95 and 96 back to the lead 75. This retracts the latch 66 and allows the carriage to move to the right until the latch bar 65 engages on the side face of the actuator 10 which was depressed, this being shown in Figure 9, each actuator having an upwardly extending portion 97 (see Figure 8), which, when the actuator is pressed inwardly is brought into the path of motion of the member 65. Closing of the switch 92 also energizes a latch solenoid 132a to project a latch 132 into a notch 133 in the bar 14 which prevents motion of the bar 14 to the left which would be necessary to permit a second actuator 10 to be pushed. This solenoid is energized from leads 95 and 134, solenoid 132a, lead 135, normally closed switch 131, leads 78 and 71. This prevents the actuation of more than one actuator during a single cycle. Just before the member 65 strikes the portion 97 of the actuator, a switch actuating arm 98 carried by the latch member 65 contacts with the portion 97, retracting the arm 98 against the action of a spring 99 and closing a mercury switch S4.

The closing of the switch S4 establishes a circuit from the source through the leads 71, 78, 100, switch S4, lead 101, printing solenoid C4, and lead 75. The energization of the solenoid C4 actuates the printing hammer 105 which presses the ink ribbon 85 upwardly into contact with the two sets of type. One of these sets of type is on the element 31 carried by the actuator 10 which was depressed to start the cycle of motion and prints on the ticket 90 its corresponding unit price at 110, while the other printing action takes place against the type in the zone 6 corresponding to the actuator which was depressed and the total weight in alinement therewith in the zone 5 thus to print the total cost at the point 111 on the ticket 90 as shown in Figure 6. The hammer 105 has a spring arm extension 112 which underlies, and when actuated, lifts the type element 31.

As the printing hammer 105 is about to complete its printing stroke it closes two switches S3 and S5. Closing of the switch S5 establishes a circuit from the lead 75 through the lead 57, the solenoid C5, lead 115, switch S5, lead 116 to lead 78. The solenoid C5 acts upon a rack bar 120 (see Figure 8) to rotate a strip feed roll 122 of a strip carrier through the pinion 124, this roll 122 cooperating with a roll 125 through the nip between which a paper strip 126 is passed, this strip 126 providing the material of which the tickets 90 are made.

The closing of the switch S3 completes a holding circuit for the motor 50 about the switch S5 which is but momentarily actuated. This circuit is from the lead 116, switch S3, lead 120, solenoid 121, lead 122, switch 60, lead 58, motor 50 and solenoid 56 to lead 57. The energization of the solenoid 121 closes a holding switch 127 against the action of a spring 128, this establishing a connection from the lead 78 through the switch 127, lead 129, lead 120, the solenoid 121, and lead 122. Consequently interruption of the circuit at the switch S5 and S3 does not interrupt the circuit through the motor 50, this continuing its motion until its controlling circuit is interrupted at the switch 60 on the return of the carriage. When the carriage returns it not only strikes and opens the switch 60, but a cam 130 thereon opens a switch at 131 interrupting the circuit to a latch solenoid 132 which releases the bar 14 for subsequent actuation of any selected actuator 10 to start a new cycle. Also as the carriage is moved to its starting position, a vertically slidable knife 140 (see Figures 8 and 10) which extends across the paper strip 126 is depressed against a spring 141 by contact of the outer end of an actuating bell crank lever 142 on the casing of the machine. Thus the part of the paper strip on which the printing has been made is cut off from the remainder of the strip in position to be removed from the machine and presented with the purchase to the cashier.

From an inspection of Figure 10, it will be noted that the switches S1 and S2 are originally closed through a ratchet mechanism at 150 which steps around a square cam 151, so that at alternate actuations the switches S1 and S2 are closed and then opened. The return of the carriage causes the stop 65 to impinge upon a shoulder 152 of the bar 14 which moves it to the left sufficiently to release the actuator previously pressed inwardly and at the same time to step around the cam 151 a quarter of a revolution to open the switches S1 and S2. The parts are therefore again in position to receive a weight on the scale pan and to start a new cycle of operations responsive to the amount of this weight. While the printing ribbon is shown of a rudimentary type for the sake of illustration, it of course would be evident that in actual practice it would be provided with means for stepping it around to present a fresh ink surface as is commonly done in connection with typewriters, but to avoid complication this has not been shown in the present application.

It will be noted that the motion of the printing mechanism is radial to the drum 4 and thus perpendicular to motion of the type under weight variations so that the actuation of the printing mechanism does not interfere with the free response of the weighing mechanism to load placed on the scale.

From the foregoing description of an embodiment of the invention, it should be evident to those skilled in the art that various changes and modificatons might be made without departing from its spirit or scope.

I claim:

1. A weighing scale comprising a drum carrying type on its periphery in different zones spaced axially therealong, one of said zones having weight indicating type and others of said zones indicia type corresponding to the product of the alined weight indications and predetermined prices per unit weight, a plurality of movable actuators each having a type indication of prices per unit weight and arranged corresponding to the price factors of said product indicia type, a printing carriage movable axially of said drum in position to operatively cooperate with axially arranged type on said drum, a print-receiving strip carrier and printing mechanism carried by said carriage, said drum being responsive in position to the weight of goods placed on said scale to position said drum angularly with the correct weight indicia type in operative relation to said carriage and its print receiving strip, and means responsive to actuation of any selected of said actuators to position said carriage in successive operative relationship to the correct weight indicia and the corresponding price indicia per unit weight corresponding to the actuator selected and to actuate said printing mechanism to print the indications from the type on said drum of weight and corresponding total price in accordance with the actuator selected.

2. A scale comprising a rotary type-carrying drum mounted for angular positioning corresponding to a weight placed on said scale, said drum having in one axial zone of its periphery type of weight indications and in other axial zones type of prices corresponding to axially alined weight indications at various prices per unit weight, all the price indications for the same price per unit weight being arranged in the same peripheral zone and in axial alinement with the corresponding weight indication, a carriage movable parallel to the axis of said drum and in proximity to the type thereon, yielding means normally holding said carriage near to one end of said drum and spaced from said one axial zone, means for returning said carriage toward the other end of said drum and there locking it, a plurality of movable actuators arranged lengthwise of the axis of said drum and each having a type indication thereon of price per unit weight, said actuators being arranged along the length of said drum adjacent to the corresponding price indication zones corresponding to such unit prices, said carriage having type impressing mechanism and a carrier for a strip upon which said drum and actuator type may be impressed by said mechanism, and means actuated by motion of any selected actuator to first actuate said mechanism to print on said strip the weight indicating type corresponding to the weight on said scale, to then release said carriage for motion along said drum effected by said yielding means to said selected actuator and to the drum zone corresponding to said selected actuator, to then actuate said mechanism to print on said strip the unit price from said selected actuator type and the total price from the type on said price zone corresponding to said selected actuator, and then to actuate said carriage-returning means to return the carriage to starting position.

3. A printing scale comprising a drum responsive in angular position to weight on said scale and carrying type on its periphery, the type in one peripheral zone perpendicular to the axis of said drum comprising weight indicia, and in the other zones total prices corresponding to longitudinally alined weight indicia for different unit weight prices, a carriage movable longitudinally of said drum, a paper strip carrier carried by said carriage, a plurality of movable actuators arranged lengthwise of said drum, each corresponding to one unit price, means for feeding the strip on said carrier in steps of predetermined length crosswise of the direction of motion of said carriage, means for cutting off lengths of said strip, mechanism on said carriage for impressing type on said drum opposite thereto onto said strip, and means set into operation by actuation of any selected of said actuators to hold said drum in angular position and while said drum is so held to position said carriage successively with said mechanism in operative relation to the weight in said indicia zone and in the price zone corresponding to the actuator selected and to actuate said mechanism in said positions to print weight and the total price on said strip and for actuating said cutting off means to sever the printed portion of said strip from the remainder and to actuate said strip feeding means to present a new length of said strip into printing position.

4. A printing scale comprising a drum responsive in angular position to weight on said scale and carrying type on its periphery, the type in one peripheral zone perpendicular to the axis of said drum comprising weight indicia, and in other zones total prices corresponding to longitudinally alined weight indicia for different unit weight prices, a carriage movable longitudinally of said drum, a paper strip carrier carried by said carriage, a plurality of actuators arranged lengthwise of said drum each corresponding to one unit price and having a corresponding price type thereon, means for feeding a strip on said carrier in steps of predetermined length crosswise of the direction of travel of said carriage, means for cutting off lengths of said strip, mechanism on said carriage for impressing type on said drum opposite thereto and on a selected actuator onto said strip, and means set into operation by actuation of any selected of said actuators to hold said drum in angular position and while said drum is so held to position said carriage successively in operative relation to type in said weight indicia zone and in the price zone corresponding to the actuator selected and to the type on said actuator and to actuate said mechanism in said positions to print weight, price per unit weight and the total price on said strip, and for actuating said cutting off means to sever the printed portion of said strip from the remainder and to actuate said strip feeding means to present a new length of said strip into printing position.

5. A printing scale comprising a drum responsive in angular position to weight on said scale and carrying type on its periphery, the type in one peripheral zone perpendicular to the axis of said drum comprising weight indicia, and in the other zones total prices corresponding to longitudinally alined weight indicia for different unit weight prices, a carriage movable longitudinally of said drum, a paper strip carrier carried by said carriage, a plurality of movable actuators arranged lengthwise of said drum, each corresponding to one unit price, means for feeding a strip on said carrier in steps of predetermined length crosswise of the direction of travel of said carriage, means for cutting off lengths of said strip, mechanism on said carriage for impressing type on said drum opposite thereto onto said strip, and means set into operation by actuation of any selected of said actuators to hold said drum in angular position and while said drum is so held to position said carriage successively with said mechanism in operative relation to the weight in said indicia zone and in the price zone corresponding to the actuator selected, and to actuate said mechanism in said positions to print weight and the total price on said strip, and for actuating said cutting off means to sever the printed portion of said strip from the remainder, and to actuate said strip feeding means to present a new length of said strip into printing position and finally to return the machine to starting condition with said drum released.

6. A printing scale comprising a drum responsive in angular position to weight on said scale and carrying type on its periphery, the type in one peripheral zone perpendicular to the axis of said drum comprising weight indicia, and in other zones total prices corresponding to longitudinally alined weight indicia for different unit weight prices, a carriage movable longitudinally of said drum, a paper strip carrier carried by said carriage, a plurality of actuators arranged lengthwise of said drum each corresponding to one unit price and having a corresponding price type thereon, means for feeding the strip in steps of predetermined length crosswise of the direction of travel of said carriage, means for cutting off lengths of said strip, mechanism on said carriage for impressing type on said drum opposite thereto and on a selected actuator onto said strip, and means set into operation by actuation of any selected of said actuators to hold said drum in angular position and while said drum is so held to position said carriage successively in operative relation to type in said weight indica zone and in the price zone corresponding to the actuator selected and to the type on said actuator, and to actuate said mechanism in said positions to print weight, price per unit weight and the total price on said strip, and for actuating said cutting off means to sever the printed portion of said strip from the remainder and to actuate said strip feeding means to present a new length of said strip into printing position and finally to return the machine to starting condition with said drum released.

7. A weighing scale comprising a drum carrying type on its periphery in different zones spaced axially therealong, one of said zones having weight indicating type and others of said zones indicia type corresponding to the product of the alined weight indications and predetermined prices per unit weight, a plurality of movable actuators each having a type indication of prices per unit weight and arranged corresponding to the price factors of said product indicia type, a printing carriage movable axially of said drum in position to operatively cooperative with axially arranged type on said drum, a print-receiving strip carrier and printing mechanism carried by said carriage, said drum being responsive in angular position to the weight of goods placed on said scale to position said drum angularly with the correct weight indicia type in operative relation to said carriage and its print receiving strip, printing actuating means, means responsive to the actuation of any selected of said actuators to actuate said printing actuating means while said printing means is opposite to said one zone to print on said strip the weight indication corresponding to the angular position of said drum, a carriage moving mechanism actuated by operation of said printing actuating means to cause motion of said carriage to the position to bring said printing mechanism opposite to a zone of said drum corresponding to the product of the weight indicia by the selected actuator price per unit weight, and means actuable by the approach of said carriage to said position to again actuate said printing mechanism to print on said strip the type indication carried by the selected actuator and the total price on the corresponding zone of said drum.

8. A scale comprising a rotary type-carrying drum mounted for angular positioning corresponding to a weight placed on said scale, said drum having in one axial zone of its periphery type of weight indications and in other axial zones type of prices corresponding to axially alined weight indications at various prices per unit weight, all the price indications for the same price per unit weight being arranged in the same peripheral zone and in axial alinement with the corresponding weight indication, a carriage movable parallel to the axis of said drum and in proximity to the type thereon, yielding means normally holding said carriage near to one end of said drum and spaced from said one axial zone, means for returning said carriage toward the other end of said drum and there locking it, a plurality of movable actuators arranged lengthwise of the axis of said drum each having a type indication thereon of price per unit weight, said actuators being arranged along the length of said drum adjacent to the corresponding price indication zones corresponding to such unit prices, said carriage having type impressing mechanism and a carrier for a strip upon which said drum and actuator type may be impressed by said mechanism, printing actuating means, means responsive to the actuation of any selected of said actuators to actuate said printing actuating means while said printing means is opposite to said one zone to print on said strip the weight indication corresponding to the angular position of said drum, a carriage release mechanism actuated by operation of said printing actuating means to cause motion of said carriage to the position to bring said printing mechanism opposite to a zone of said drum corresponding to the product of the weight indicia by the selected actuator price per unit weight, means actuable by the approach of said carriage to said position to again actuate said printing mechanism to print on said strip the type indication carried by the selected actuator and the total price on the corresponding zone of said drum, and means actuated by said printing mechanism at the second printing to actuate said strip carrier to feed said strip.

9. A scale comprising a rotary type-carrying drum mounted for angular positioning corresponding to a weight placed on said scale, said drum having in one axial zone of its periphery type of weight indications and in other axial zones type of prices corresponding to axially alined weight indications at various prices per unit weight, all the price indications for the same price per unit weight being arranged in the same peripheral zone and in axial alinement with the corresponding weight indication, a carriage movable parallel to the axis of said drum and in proximity to the type thereon, yielding means normally holding said carriage near to one end of said drum and spaced from said one axial zone, means for returning said carriage toward the other end of said drum and there locking it, a plurality of movable actuators arranged lengthwise of the axis of said drum each having a type indication thereon of price per unit weight, said actuators being arranged along the length of said drum adjacent to the corresponding price indication zones corresponding to such unit prices, said carriage having type impressing mechanism and a carrier for a strip upon which said drum and actuator type may be impressed by said mechanism, printing actuating means, means responsive to the actuation of any selected of said actuators to actuate said printing actuating means while said printing means is opposite to said one zone to print on said strip the weight indication corresponding to the angular position of said drum, a carriage release mechanism actuated by operation of said printing actuating means to cause motion of said carriage to the position to bring said printing mechanism opposite to a zone of said drum corresponding to the product of the weight indicia by the selected actuator price per unit weight, means actuable by the approach of said carriage to said position to again actuate said printing mechanism to print on said strip the type indication carried by the selected actuator and the total price on the corresponding zone of said drum, means actuated by said printing mechanism at the second printing to actuate said strip carrier to feed said strip, and means actuated by said printing mechanism at the second printing to actuate said return mechanism to return said carriage to starting position.

10. A scale comprising a rotary type-carrying drum mounted for angular positioning corresponding to a weight placed on said scale, said drum having in one axial zone of its peripheral type of weight indications and in other axial zones type of prices corresponding to axially alined weight indications at various prices per unit weight, all the price indications for the same price per unit weight being arranged in the same peripheral zones and in axial alinement with the corresponding weight indication, a carriage movable parallel to the axis of said drum and in proximity to the type thereon, yielding means normally holding said carriage near to one end of said drum and spaced from said one axial zone, means for returning said carriage toward the other end of said drum and there locking it, a plurality of movable actuators arranged lengthwise of the axis of said drum each having a type indication thereon of price per unit weight, said actuators being arranged along the length of said drum adjacent to the corresponding price indication zones corresponding to such unit prices, said carriage having type impressing mechanism and a carrier for a strip upon which said drum and actuator type may be impressed by said mechanism, printing actuating means, means responsive to the actuation of any selected of said actuators to actuate said printing actuating means while said printing means is opposite to said one zone to print on said strip the weight indication corresponding to the angular position of said drum, a carriage release mechanism actuated by operation of said printing actuating mean to cause motion of said carriage to the position to bring said printing mechanism opposite to a zone of said drum corresponding to the product of the weight indicia by the selected actuator price per unit weight, means actuable by the approach of said carriage to said position to again actuate said printing mechanism to print on said strip the type indication carried by the selected actuator and the total price on the corresponding zone of said drum, means actuated by said printing mechanism at the second printing to actuate said strip carrier to feed said strip, means actuated by said printing mechanism at the second printing to actuate said return mechanism to return said carriage to starting position, and means actuated by said carriage on its return to starting position to stop said return mechanism.

11. A printing scale comprising a drum responsive in angular position to weight on said scale and carrying type on its periphery, the type in one peripheral zone perpendicular to the axis of said drum comprising weight indicia, and in the other zones total prices corresponding to longitudinally alined weight indicia for different unit weight prices, a carriage movable longitudinally of said drum, a paper strip carrier carried by said carriage, a plurality of movable actuators arranged lengthwise of said drum, each corresponding to one unit price, means for feeding the strip on said carrier in steps of predetermined length crosswise of the direction of motion of said carriage, means for cutting off lengths of said strip, mechanism on said carriage for impressing type on said drum opposite thereto onto said strip, and means set into operation by actuation of any selected of said actuators to hold said drum in angular position and while said drum is so held to position said carriage successively with said mechanism in operative relation to the type in said indicia zone and in the price zone corresponding to the actuator selected and to actuate said mechanism in said positions to print weight and the total price on said strip, to actuate said strip feeding means to present a new length of said strip into printing position and to actuate said cutting off means to cut off the printed portion from the remainder of said strip.

12. A scale comprising a rotary type-carrying drum mounted for angular positioning corresponding to a weight placed on said scale, said drum having in one axial zone of its periphery type of weight indications and in other axial zones type of prices corresponding to axially alined weight indications at various prices per unit weight, all the price indications for the same price per unit weight being arranged in the same peripheral zone and in axial alinement with the corresponding weight indication, a carriage movable parallel to the axis of said drum and in proximity to the type thereon, yielding means normally holding said carriage near to one end of said drum and spaced from said one axial zone, means for returning said carriage toward the other end of said drum and there locking it, a plurality of movable actuators arranged lengthwise of the axis of said drum each having a type indication thereon of price per unit weight, said actuators being arranged along the length of said drum adjacent to the corresponding price indication zones corresponding to such unit prices, said carriage having type impressing mechanism and a carrier for a strip upon which said drum and actuator type may be impressed by said mechanism, means actuated by motion of any selected actuator to lock the other of said actuators against actuation, means actuated by motion of any selected actuator to first actuate said mechanism to print on said strip the weight indicating type corresponding to the weight on said scale, to then release said carriage for motion along said drum effected by said yielding means to said selected actuator and to the drum zone corresponding to said selected actuator, to then actuate said mechanism to print on said strip the unit price from said selected actuator type and the total price from the type on said price zone corresponding to said selected actuator, then to actuate said carriage-returning means to return the carriage to starting position, and means actuated by said carriage on its return to starting position to return said selected actuator to inoperative position and to actuate said locking means to free all of said actuators for subsequent selective actuation.

JOSEPH A. VOLK.

REFERENCES CITED

The following references are of record in the file of this patent:

UNITED STATES PATENTS

| Number | Name | Date |
|---|---|---|
| 1,052,501 | Meyer | Feb. 11, 1913 |
| 1,297,020 | Shinozawa | Mar. 11, 1919 |
| 1,648,728 | Hasse | Nov. 8, 1927 |
| 2,412,777 | Chung-Chin Kao | Dec. 17, 1946 |